United States Patent [19]

Angell, Jr. et al.

[11] 4,185,070

[45] Jan. 22, 1980

[54] PROCESS FOR INJECTION MOLDING THERMOPLASTIC ARTICLES WITH REDUCED COMBUSTIBILITY

[75] Inventors: Richard G. Angell, Jr.; Laurence H. Gross, both of Bridgewater, N.J.

[73] Assignee: Union Carbide Corporation, New York, N.Y.

[21] Appl. No.: 850,370

[22] Filed: Nov. 10, 1977

[51] Int. Cl.$^2$ .............................................. B28B 1/24
[52] U.S. Cl. ........................... 264/328; 260/29.6 XA; 260/29.6 WQ
[58] Field of Search ............. 260/29.6 WQ, 29.6 XA, 260/42.15, 42.46, 42.48, 42.45, 42.44; 264/328, 329

[56] References Cited

U.S. PATENT DOCUMENTS

| 2,402,805 | 6/1946 | Cousino | 264/329 |
|---|---|---|---|
| 2,487,426 | 11/1949 | Cousino | 264/329 |
| 3,066,356 | 12/1962 | Porter | 260/29.6 WQ |
| 3,299,186 | 1/1967 | Wallace | 260/29.6 XA |
| 3,563,939 | 2/1971 | Stevens | 260/37 N |
| 3,719,441 | 3/1973 | Spaak | 264/51 |
| 3,741,929 | 6/1973 | Burton | 260/42.46 |
| 3,826,775 | 7/1974 | Sobolev | 260/42.45 |
| 3,847,865 | 11/1974 | Duggins | 260/42.52 |
| 3,922,442 | 11/1975 | North | 260/42.15 |
| 3,936,403 | 2/1976 | Sakaguchi | 260/42.46 |
| 3,957,723 | 5/1976 | Lawson | 260/42.46 |

Primary Examiner—Paul R. Michl
Attorney, Agent, or Firm—Gerald R. O'Brien, Jr.

[57] ABSTRACT

A process is disclosed for the production of injection molded thermoplastic articles having reduced combustibility comprising: maintaining a mold cavity at a preselected back pressure sufficiently high to substantially prevent foaming of a thermoplastic melt to be injected therein; injecting thermoplastic melt into said mold cavity under a pressure in excess of said back pressure to fill said mold cavity; said thermoplastic melt containing from about 50 to 70% by weight of alumina trihydrate and from about 1 to 12% by weight of water as a liquid processing aid.

10 Claims, 3 Drawing Figures

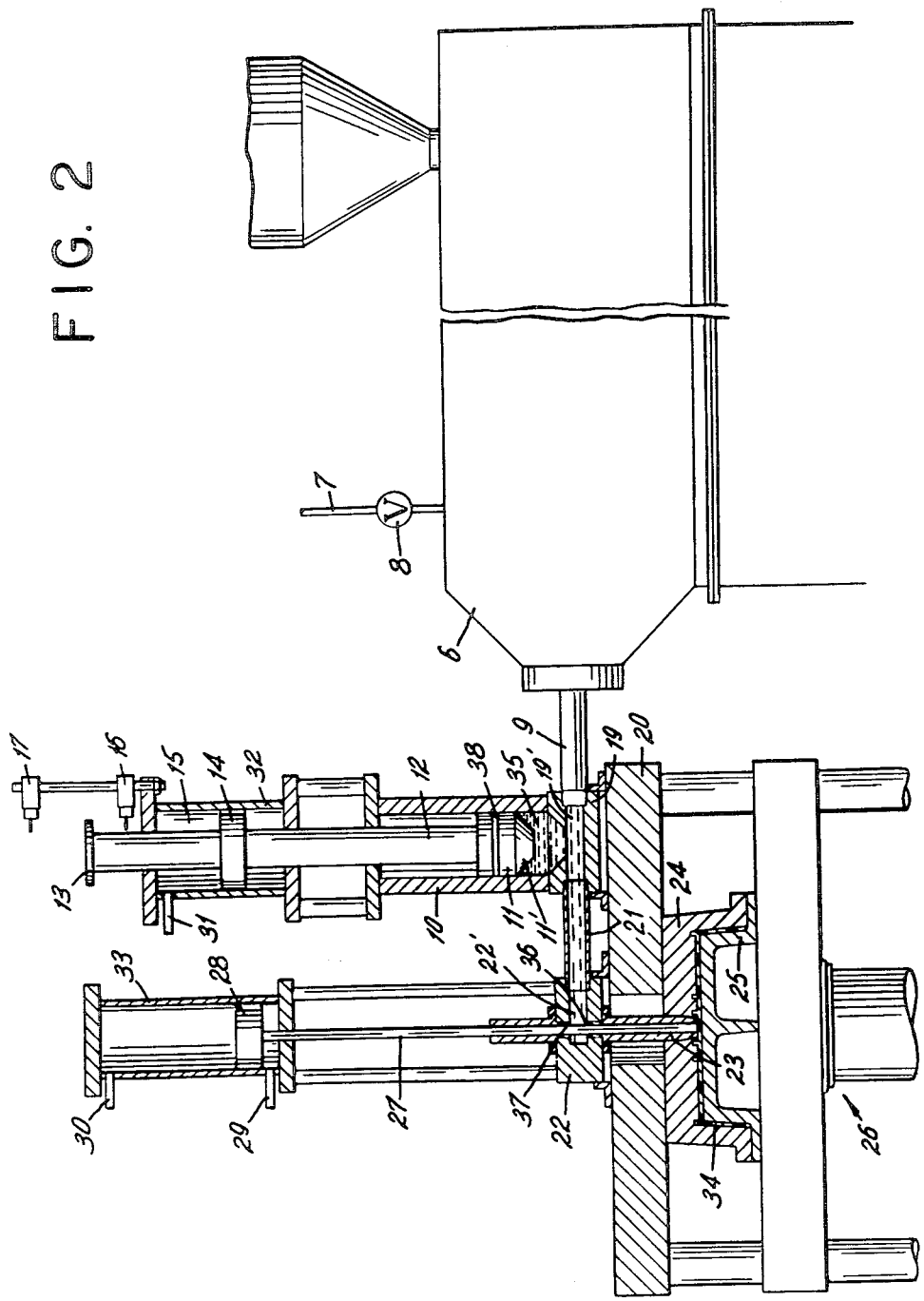

PROCESS FOR INJECTION MOLDING THERMOPLASTIC ARTICLES WITH REDUCED COMBUSTIBILITY

Injection molded thermoplastic articles which exhibit low combustibility properties would be a desirable addition to the marketplace. Whatever additives are used with the thermoplastic material to impart the reduction in combustibility should also have low toxicity, have low smoke generation, and be easily processible.

One additive which will impart a reduction in combustibility is alumina trihydrate (ATH), $Al_2O_3.3H_2O$. This material does have a low toxicity and low smoke generation. A problem with the material is that relatively high levels ($\geqq 50$ percent ATH) of it are required to achieve the desired reduction in combustibility. These high levels of ATH present extreme problems in processibility of the compound. In addition, high filler loadings also usually result in a precipitous loss in impact strength.

This invention presents a way of overcoming the above-mentioned problems. A processing aid in the form of a liquid is used to increase the throughput of the compound through the processing equipment, allowing a tough part with low combustibility to be formed.

In accordance with the present invention, a process is provided for the production of injection molded thermoplastic articles having reduced combustibility comprising: maintaining a mold cavity at a pre-selected back pressure sufficiently high to substantially prevent foaming of a thermoplastic melt to be injected therein; injecting thermoplastic melt into said mold cavity under a pressure in excess of said back pressure to fill said mold cavity; said thermoplastic melt containing from about 50 to 70% by weight of alumina trihydrate and from about 1 to 12% by weight of water as a liquid processing aid.

The invention employs thermoplastic polymers such as: high density polyethylene (HDPE), low density polyethylene, polypropylene, ethylene/vinyl acetate copolymer, ethylene/ethyl acrylate copolymer, and other homopolymers and interpolymers of olefins; polystyrene and styrene copolymers such as a polymer of acrylonitrile, styrene, and butadiene; polycarbonates such as 4,4'-bis-phenol-A-based polycarbonate, acetal homopolymers and copolymers; polyamides such as nylon 6 and nylon 6/6; polyaryl polyhydroxy ethers (e.g., the high molecular weight, base catalyzed, condensation product of 4,4'-bis-phenol-A and epichlorohydrin); polysulfones (e.g., a polymer that can be represented by the formula:

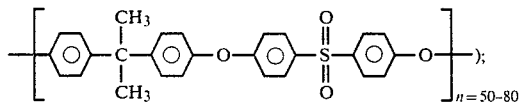

polyesters such as polyethylene terephthalate; polymethyl methacrylate and other acrylic polymers; and other thermoplastic polymers, which can be employed either singly or in mixtures. Conventional additives such as heat and light stabilizers, plasticizers, anti-oxidants, fillers, dyes and other colorants, can be employed in the thermoplastic polymer composition.

It is to be understood that the back pressure maintained on the mold cavity may be any pressure sufficient to prevent foaming and preferably at or above 150 psi. Most conveniently a back pressure of the order of about 200 to 450 psi is employed.

It has been found in the practice of the process of the invention that the pressure under which thermoplastic melt is introduced into the mold cavity may be any pressure greater than the back pressure of the mold. It has been found preferable, however, to employ a pressure above about 1500 psi and, most preferably, a pressure of about 2500 to 3500 psi as the introducing pressure.

It has also been found that, in order to impart to the injection molded thermoplastic articles the desired reduced combustibility characteristics, the thermoplastic melt should contain from about 50 to 70% by weight of alumina trihydrate. The employment of at least about 50% by weight of alumina trihydrate is required in order to achieve the UL 94 V-0 characteristics (described hereinbelow) and the employment of greater than about 70% by weight has been found to impart to the thermoplastic melt, flow characteristics which produce processing difficulties. A preferred range of alumina trihydrate content of from about 55 to 65% by weight is desired with the most preferred characteristics being imparted to the melt and resultant injection molded thermoplastic articles at about 60% by weight of alumina trihydrate content.

Although the mechanism of the invention is not completely understood, it is believed that the water processing liquid passes along in the process admixed in the liquid state and, as such, carries over into the molded article as a series of liquid masses, providing no gross foaming characteristics to the resultant molded article. The liquid ultimately diffuses out, leaving an article of slightly lower density and containing some fine pores. This phenomenon is exhibited up to about the volume fraction of the liquid used in the molding.

It is, however, to be understood that it is not the initial processing liquid retention which provides the high combustibility resistance of the articles of the present invention, but rather, the high degree of filling with ATH. This high resistance to combustibility is retained even after the processing liquid diffuses from the resultant articles.

The equipment suitable for use in the practice of the process of the invention is similar to but modified from that used to process conventional low pressure process structural foam (see, for example, Angell, U.S. Pat. Nos. 3,268,636, 3,436,446 and 3,988,403 and particularly the equipment of FIG. 1 of U.S. Pat. No. 3,436,446).

In the drawings:

FIG. 2 is a side elevational view substantially in cross-section, of apparatus suitable for the practice of the process of the present invention.

Figure 3:
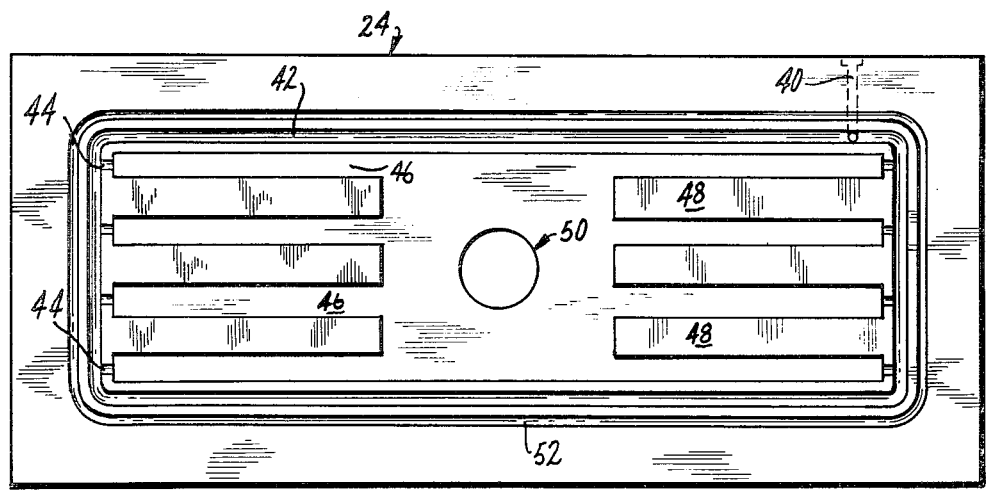
FIG. 3 is a plan view of a mold capable of use in practicing the process of the present invention.

The additions to the apparatus which enable one to practice the invention are as follows:

First, the conventional structural foam apparatus provides means for the introduction of nitrogen gas into the extruder barrel to produce the foamable material. The process of the present invention requires the introduction of a liquid into the extruder barrel through line 7 of FIG. 2 in place of the gas. As a result of the high pressure (~1500 psi) and temperature (~375°-400° F.) in the extruder barrel and the mixing action of the screw, the liquid introduced is distributed throughout the polymeric compound as it proceeds through the extruder.

The second difference from the conventional low (clamp) pressure structural foam apparatus and that of the apparatus for practicing the invention is at the mold. The conventional apparatus allows the material which enters the mold cavity to expand and produce a foam product. If that procedure were to be used for the liquid-containing compound, the fast rate of pressure drop would cause the liquid to flash to vapor. This would result in a foamed molded part or imperfections in the body or surface of the part. To inhibit this undesirable feature, the mold cavity is back-pressured, as shown by way of example, through conduit 40 in the mold of FIG. 3, prior to introducing the molten polymeric material. The back pressure is sufficiently high to inhibit most of the liquid from flashing. Hence the articles are essentially solid. For most materials, for the levels of liquid employed, the pressure required to reduce the flashing is of the order of at least about 100 psi. The actual pressure required to completely inhibit flashing is dependent on the particular liquid used, its vapor pressure, the melt temperature, and the rheology of the composition. (The final molded parts are known to contain substantially The apparent viscosity-shear rate curves for a series of compounds containing various filler concentrations were obtained by use of an Instron Rheometer. The compounds were compounded in an 8-pound Banbury mixer, granulated, and then tested in the Rheometer, using standard procedures at 190° C. The die diameter was 0.030" with a length-to-radius ratio of 67.1 No Rabinowitsch corrections were made to the shear rate and no end corrections made for the shear stress. The apparent viscosities at the lowest shear rates obtainable with the above-mentioned Rheometer were then plotted against the percent ATH of each compound. The sharp rise in viscosity at about 40 percent ATH is indicative of the increasing difficulty in processing the compounds.

The effect and usefulness of water as a liquid processing aid may be seen by comparing the throughput rates of filled polymeric systems molded with and without the use of liquids as set forth in Table I below. Method 1, as referred to in the Table, relates to the case in which material is extruded from the nozzle into the air. Method 2, as referred to in the Table, relates to the case in which parts are molded into a 6"×18"×½" rectangular mold cavity and the indicated back pressure used. Table I shows that the use of a liquid processing aid increases the rate of flow through the nozzle and into and within the mold cavity.

TABLE I

| Polymer | Percent liquid rel. to compound | Method Used | Mold Back Pressure (psig) | Rate of Flow (lb/sec) | % increase in rate of flow due to use of liquid | Example No. |
|---|---|---|---|---|---|---|
| poly(methyl methyl-acrylate) (PMMA) | None | 1 | — | 0.0083 | — | 1 |
|  | 1.2 $H_2O$ | 1 | — | 0.031 | 273 | 2 |
| HDPE (MI=8 gm/10 min.-ASTM-D-1238E, $\rho$ = 0.96 gm/cc) | None | 1 | — | 0.050 | — | |
|  | 6.2 Ethanol | 1 | — | 0.233 | 360 | |
| propylene homopolymer (MF=5;ASTM-D-1238, $\rho$ = 0.905 gm/cc) | None | 2 | 0 | 0.031 | — | 3 |
|  | 8.7 $H_2O$ | 2 | 0 | 0.095 | 205 | 4 |
| High impact (rubber modified) polystyrene (MI = 0.93 gm/10 min. ASTM-D-1238E; Heat Distortion Temp. = 75.3° C., ASTM-D-648) | None | 2 | 400 | 0.027 | — | 5 |
|  | 5.9 $H_2O$ | 2 | 400 | 0.097 | 256 | 6 |

Note:
All compositions contain 40 parts by weight of water as listed polymer, 60 parts by weight of ATH having an average particle size of about 1 micron, and listed amount of indicated liquid.

the same amount of liquid as was introduced in the extruder. Hence, the parts are not absolutely solid polymeric materials. In fact, it has been shown that molded parts from which the fluid has diffused will reabsorb about the same amount of fluid as was used in the molding. Hence, molded parts do have void-volumes roughly equivalent to the concentration of fluid incorporated. These are assumed to be pore- or channel-like voids. To reiterate then, the parts appear from visual inspection to be essentially solid. That is, they are not visibly cellular in the sense of structural foam parts.)

The remainder of the process is substantially non-critical and within the skill of the art. This includes cooling the part sufficiently so that the back pressure may be relieved without foaming or other distortion and the part removed from the mold cavity.

Figure 1:
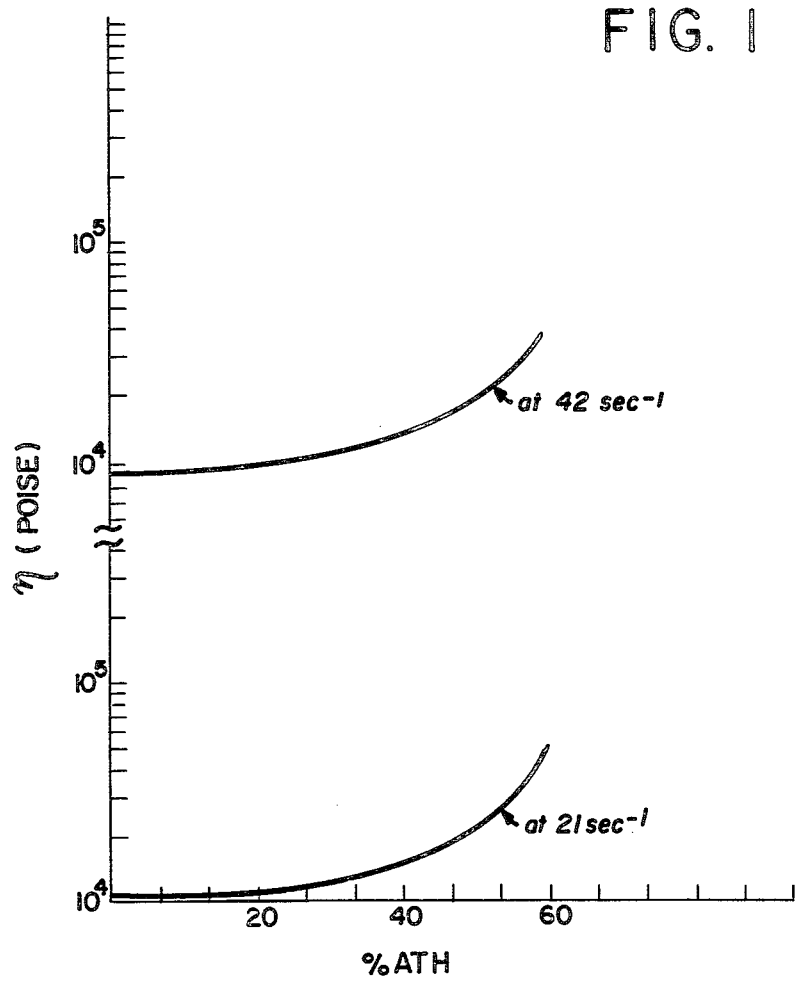
FIG. 1 is a graphical representation of a relationship between the viscosity and the percentage content of alumina trihydrate in the thermoplastic melt at two different shear rates.

The importance of the liquid in the system rests on the ability to process polymeric systems with high levels of filler loading. As pointed out above, one ramification of this is the ability to process polymeric systems filled with ATH for reduced combustibility. A graphical representation of the problem is shown in FIG. 1.

Referring now to FIG. 2, the preferred apparatus of this invention for carrying out the present method is shown to include an extruder 6 having attached thereto a line 7 for feeding a liquid processing aid directly into the barrel of extruder 6. A valve 8 is provided on line 7 to control the feeding. Line 9 connects the extruder 6 to the internal conduit 19' of a base member 19 which is shown resting on a support member 20. Extending upward from the base member 19 is an accumulator device which includes a cylinder 10 and a piston 11 reciprocally movable therein. The piston 11 is shown having a frusto-conical head 11' and is machined to nearly the same diameter as cylinder 10 to provide a seal between the cylinder 10 and the piston 11. Attached to the rear of piston 11 and extending upward therefrom is a shaft 12.

A flange member 13 is attached to the other end of the shaft 12 and a piston 14 is located on the shaft at a position intermediate the piston 11 and the flange 13. The piston 14 is adapted to reciprocate within a piston housing 32. It should be noted that flange 13 is located at the uppermost functional end of the shaft 12 and need not be located at the actual physical end thereof. The configuration of the flange 13 is critical only to the extent that it must extend from the shaft 12 and contact switches 16 and 17 during the reciprocal movement of the shaft 12.

Alternatively, photoelectric type switches can be employed if desired, thus eliminating the need for a projecting member on the shaft 12. A pair of photoelectric units can be positioned such that shaft 12 blocks the light path of lower unit when the shaft moves upwardly from its lowest position and blocks the light path of an upper unit when it reaches the desired upper position.

Leading from the internal conduit 19' of the base member 19 is a line 21 which is connected to an internal conduit 22' of a second base member 22 which is also resting on the support member 20. Extending downward from the base member 22, and through the support member 20 is a filling nozzle 23. It should be evident that a plurality of filling nozzles can be employed to mold one or more articles. The lower end of the nozzle 23 extends to and is flush with a mold cavity defined by a male mold half 25 and a female mold half 24. Mold half 24 is conveniently affixed to the support member 20 and the mold half 25 is supported by a reciprocating bed 26 adapted to provide for easy separation of the mold halves 24 and 25 to facilitate product removal. Slidably mounted in the nozzle 23 and the base member 22 is a rod 27. The upper end of the rod 27 is provided with a piston 28 which reciprocates within a piston housing 33. The housing 33 is provided with a pair of conduits 29 and 30 which are alternately connected to a source of gas under pressure.

The operation of the preferred apparatus shown in FIG. 2 is as follows. Thermoplastic material is fluxed in the extruder 6. The liquid processing aid is admitted under pressure directly into the barrel of the extruder by means of line 7 and is admixed therein with the melted thermoplastic. The extruder 6, which is in continuous communication with an expanding accumulation zone 35 defined by the cylinder 10, the piston 11 and the base member 19, continuously extrudes the mixture of thermoplastic material and liquid processing aid through line 9, into the zone 35, and against the piston 11. As the mixture is fed from the extruder into the zone 35, the piston is forced from its lowermost position to an upper, predetermined position. In FIG. 2, the lowermost position of the piston 11 is reached when the piston 11 comes in contact with the base member 19. The upward travel of piston 11 and piston 14 is resisted by means of a gas under pressure in the region 15 above the piston 14 in the piston housing 32. The phrase "gas under pressure" is intended to include any suitable hydraulic fluid conventionally used in such apparatus. In addition, the region 15 in the piston housing 32 is provided with a conduit 31 which is in communication with a source of gas under pressure. As the material from the extruder forces piston 11 upward, and at the same time forces piston 14 upward, the gas in region 15 is compressed. Since the charging of the zone 35 is opposed by the piston 11, the filling of the zone 35 cannot start until the extruder pressure exceeds the back-pressure of the piston 11. As the piston 11 moves upward, the gas volume in region 15 is decreased and the gas pressure is increased. The extruder pressure must continuously exceed the increasing piston pressure during the expansion of the zone 35. Alternatively, during the expansion of the zone 35, the pressure of the gas in region 15 can be regulated so that a substantially constant force is applied to the piston 14. In any case, the mixture being charged into the expanding zone 35 must be maintained at a pressure above which foaming occurs. While a pressure of as low as about 500 psi will normally prevent foaming of the mixture, pressures of at least 1500 psi have been found to give best results. Pressures in excess of 10,000 psi are usually not required for proper operation of the accumulator device and normally should be avoided because operating expenses increase with increasing pressures.

In addition, the cylinder 10 is provided with heating means, not shown, to maintain the mixture in the molten state and thus prevent solidification of thermoplastic material therein. It should be noted, however, that no heating of the mixture in the cylinder 10 is required. Heat is applied to the mixture in the extruder 6 and is only maintained in the cylinder 10.

The piston 11 travels upward until the flange 13, carried by the shaft 12, contacts the switch 17 located at a predetermined position. In a manner well known in the art, the activation of the switch 17 causes gas under pressure to enter piston housing 33 through conduit 29 and produces an upward motion of the piston 28. The lower end of the rod 27 is thereby withdrawn from the nozzle 23 until it reaches a position indicated by the reference numeral 37. Communication between the mold defined by mold halves 24 and 25 and the zone 35 is thus established. At the instant communication is established, the mixture is forced from the accumulation zone 35 into the mold because the pressure within the region 15, which has now become greater than the pressure within the zone 35, causes the downward motion of the piston 11 until it reaches its lower-most position. If necessary, the line 21 and the base member 22 can be provided with heating means, not shown, to prevent solidification of thermoplastic material therein.

When the piston 11 reaches its lower-most position the zone 35 is essentially collapsed and the flange 13 contacts the switch 16, and in a manner well known in the art, gas under pressure is caused to enter the piston housing 33 through conduit 30 thereby producing a downward movement of the piston 28 and the rod 27. At the instant the rod 27 enters the nozzle 23 at the point 36, communication is terminated between the mold and the accumulation zone 35 at a point where the pressure is above the foaming pressure of the mixture. As the rod 27 travels downward it forces the mixture in the nozzle 23, that is, between the point 36 and the mold, into the mold and the bottom of the rod 27 comes flush with the molded article 34. In this manner, a sprue-free molded article is produced and the formation of an unfoamed slug in the system prevented. After cooling, the mold halves 24 and 25 are separated and the sprue-free molded article 34 is removed. It should be evident that articles can be molded according to the present invention having either a sprue or a depression simply by adjusting the rod 27. While it is preferred to mold sprue-free articles, the configuration of certain molded articles will be able to tolerate a sprue or a depression.

The flow of gas under pressure through conduits 29 and 30 is controlled by means of a valve system actuated by the switches 16 and 17 in a manner well known in the art.

The switch 17 is positioned in accordance with the amount of material which is required to be charged into the mold. The greater the distance between the switches 16 and 17, the greater will be the upward travel of the piston 11. Consequently a larger amount of material will be stored in the accumulation zone 35 and subsequently forced into the mold. Conversely, decreasing the space between the switches 16 and 17 decreases the amount of material which will be forced into the mold.

The temperature of the mold is not critical. Cold molds, e.g. at room temperature, about 20° C., can be used to produce molded articles. Lower mold temperatures are preferred since the time required for cooling the article in the mold is shorter. Higher mold temperatures permit more flow of the molten mixture in the mold prior to cooling than with a cooler mold.

From the foregoing description, it is evident that the process and preferred apparatus of this invention can be employed to rapidly, efficiently, and automatically mold filled thermoplastic articles on a batch, semi-continuous or continuous basis.

The extruder 6 of the apparatus of FIG. 2 of the drawings used in the examples set forth herein employed a 2½" diameter screw with a 24:1 length to diameter ratio. A 40 HP DC motor was employed utilizing a silicon control rectifier which pumped approximately 120 lb./hr. at 125 rpm. There were four heating zones on the barrel. The two-stage extruder screw had 24 flights. In the first stage, there were five feed flights at 0.440" depth, four transition flights, and four metering flights at 0.110" depth. There was a 0.050 inch deep blister at the end of the first stage. After one decompression flight at 0.500" depth, in which the fluid injection port was located, there was one transition flight, 6½ metering flights at 0.135" depth, and two flights of LeRoy mixing head. A 50 ton press was used with this extruder.

In the mold frame 24 (overall length 9"×20") shown in FIG. 3 of the drawings, the back pressure gas was maintained through inlet port 40 (⅛" diam., 1½" depth) which communicated with gas manifold channel 42 (¼" wide, ⅛" depth) which, in turn, communicated through ports 44 (3/32"×1/32") with finger-shaped channels 46 (5⅜"×½"×⅜") which were intercommunicating throughout the interior of the mold cavity. The channels 46 were formed between spacer elements 48 (5⅜"×1"). Thermoplastic melt material was introduced into the mold cavity through fill port 50 (¾" diam.). There was an "O"-ring channel 52 (⅛" width) on both sides of this mold to reduce the loss of gas from the mold and contain the prescribed back pressure.

As employed herein in connection with a measure of the combustibility of injection molded thermoplastic articles, it is to be understood that the specifications for degrees of combustibility are those set forth by Underwriters Laboratories Inc. as "Standard For Tests For Flammability of Plastic Materials For Parts In Devices And Appliances," designated as UL 94 in their specification dated July 30, 1976 and set forth in Test 3 therein as "Vertical Burning Test for Classifying Materials 94 V-0, 94 V-1, or 94 V-2".

A major objective of this invention is the processing of polymeric compounds which have reduced combustibility. The ATH filled polymer systems satisfy that objective. As shown in Table II, the use of 60 parts ATH allows the production of molded articles which pass the UL 94 V-0 flame test for ⅛-inch thick samples. Twenty-three and a half and fifty percent ATH filled parts (even with 18.8 percent water) fail the UL 94 V-0 test. Sixty percent ATH filled high density polyethylene (HDPE) parts pass the UL 94 V-0 test at the same thickness. It is important to also point out that the impact resistance as measured by the notched Izod test shows a significant increase for the samples molded in the presence of water and that even when those samples are dried, their Izod values remain quite close to that of a non-filled HDPE sample.

TABLE II

All samples were moled in a 50-ton, modified structural foam machine using a high density polyethylene material (HDPE) of MI=8 gm/10 min (ASTM-D-1238E) and specific gravity of 0.96 gm/cc. The ATH used has a 1μ average particle size. The mold was as shown in FIG. 3, having dimensions set forth above. In each case the extruder temperatures were set at 350° F. and the transfer lines and accumulator were set at 370° F.

TABLE II
(Continued)

| | PREDRYING | | | | | POST DRYING (70° C. at least 2 days) | | | MOLDING CONDITIONS | | | | | |
|---|---|---|---|---|---|---|---|---|---|---|---|---|---|---|
| Ex. No. | Parts of HDPE | Parts of ATH | Percent H₂O | UL-94 V-0 Results | Notched Izod (ft-lb) | Percent weight loss | UL-94 V-0 Results | Notched Izod (ft-lb) | Mold Temp. (°F.) | Fill Time (sec.) | Back Pressure on mold (psi) | Extra. Pressure barrel (psi) | Extr. Pressure discharge (psi) | Extr. RIM |
| 7 | 76.5 | 23.5 | 27 | Fail | — | — | — | — | 70 | — | 400 | 700 | 2900 | 20 |
| 8 | 50 | 50 | 0 | Fail | 0.31 | — | Fail | — | 70 | 9 | 0 | 1300 | 3100 | 20 |
| 9 | 50 | 50 | 18.8 | Fail | 1.01 | — | Fail | 0.83 | 70 | 5 | 400 | ~1000 | 2800 | 12 |
| 10 | 40 | 60 | 5 | Pass | 1.27 | 7 | Pass | 0.86 | 70 | 19 | 425 | 1200 | 3500 | 12 |
| 11 | 100 | 0 | 0 | Fail | 0.90 | — | — | — | — | — | — | — | — | — |

The comparative combustibility test data for various % ATH/% HDPE compounds are shown in Table III, below. It is to be noted that at 50% ATH, one sample passes the UL 94 V-1 test, one marginally fails the V-1 test and two others fail it. Fifty percent (50%) ATH/50% HDPE compounds do, therefore, have a reduced combustibility, albeit marginally so. (F=Fail, P=Pass).

TABLE III

| Parts of ATH** | Parts of HDPE** | Percent H₂O used in Molding | UL-94 Results | | |
|---|---|---|---|---|---|
| | | | V-0 | V-1 | V-2 |
| 10 | 90 | 18.6 | F | F | F |
| 23.5 | 76.5 | 27 | F | F | F |
| 30 | 70 | 11 | F | F | F |
| 50 | 50 | 0 | F | P | P |
| 50 | 50 | 6 | F | F* | F* |
| 50 | 50 | 9.3 | F | F | F |
| 50 | 50 | 18.8 | F | F | F |
| 60 | 40 | 5 | P | P | P |

Note: All samples dried (70° C.; greater than or equal to 48 hours) prior to testing.
*marginally
**parts by weight As set forth hereinabove, the employment of greater than 70% by weight of ATH results in imparting to the melt flow characteristics which produce processing difficulties.

Accordingly, the use of a liquid processing aid allows greater throughput rates to be achieved and, as a particularly useful feature, allows parts with sufficiently high concentrations of ATH to be molded such that reduced combustibility parts with good impact strength may be produced.

As referred to herein, the Dart Drop impact test consists of dropping a weighted dart (about two pounds) with a 1½ inch hemispherical tip into a specimen firmly fixed by a 3-inch diameter circular clamp. The failure is noted by the appearance of a slight crack on the surface of the part.

What is claimed is:

1. The process for the production of injection molded thermoplastic articles having reduced combustibility comprising: maintaining a mold cavity at a preselected back pressure sufficiently high to substantially prevent foaming of a thermoplastic melt to be introduced therein; injecting thermoplastic melt into said mold cavity under a pressure in excess of said back pressure to fill said mold cavity; said thermoplastic melt containing from about 50 to 70% by weight of alumina trihydrate and from about 1 to 12% by weight of water as a liquid processing aid thereby permitting increased rate of thermoplastic melt flow while filling said mold cavity.

2. The process in accordance with claim 1, wherein said thermoplastic melt contains from about 55 to 65% by weight of alumina trihydrate.

3. The process in accordance with claim 2, wherein said thermoplastic melt contains about 60% by weight of alumina trihydrate.

4. The process in accordance with claim 1, wherein said thermoplastic melt is a polyolefin-containing melt.

5. The process in accordance with claim 1, wherein said thermoplastic melt is introduced into said mold cavity at a pressure of the order of about 2500 to 3500 psi.

6. The process in accordance with claim 1, wherein said mold cavity is maintained at a back pressure of about 200 to 450 psi.

7. The process in accordance with claim 4, wherein said polyolefin-containing melt is a polyethylene-containing melt.

8. The process in accordance with claim 7, wherein said polyethylene-containing melt is a high density polyethylene.

9. The process in accordance with claim 7, wherein said melt consists essentially of a polyethylene, alumina trihydrate and water as a liquid processing aid.

10. The process in accordance with claim 8, wherein said melt consists essentially of high density polyethylene, alumina trihydrate and water as a liquid processing aid.

* * * * *